May 14, 1957     R. E. SMITH     2,791,972
VIBRATOR EXCITED LOUD SPEAKER FOR TOYS
Filed Oct. 15, 1951     3 Sheets-Sheet 1
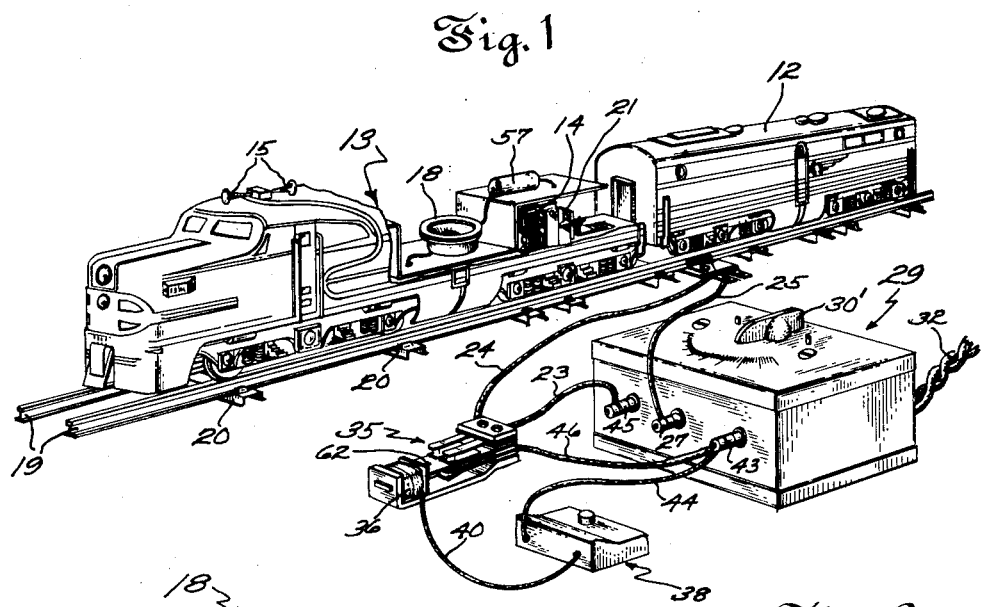
Fig. 1
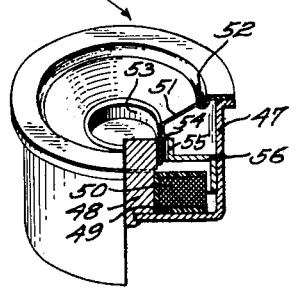
Fig. 4
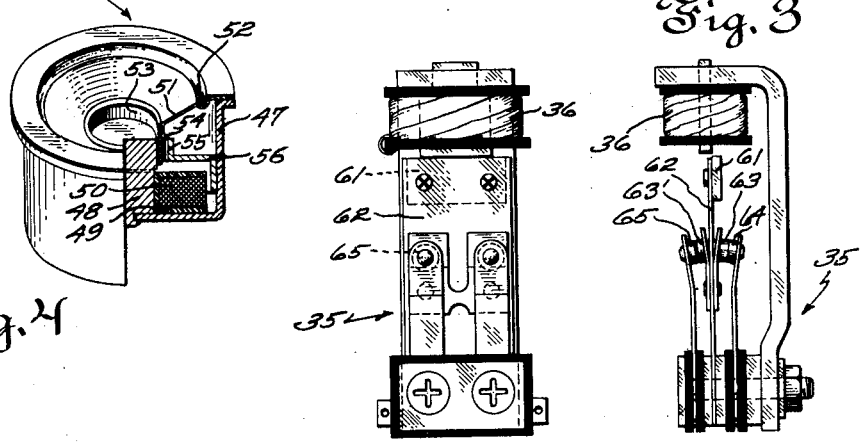
Fig. 3
Fig. 2
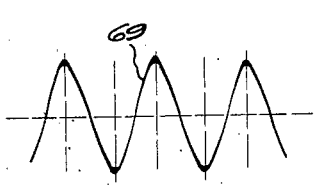
Fig. 5
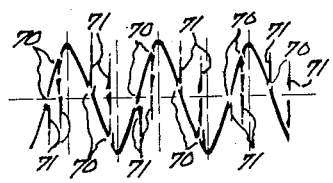
Fig. 6
INVENTOR
Raymond E. Smith,
BY
ATTORNEY INVENTOR
Raymond E. Smith
BY
ATTORNEY United States Patent Office 2,791,972
Patented May 14, 1957

2,791,972

VIBRATOR EXCITED LOUD SPEAKER FOR TOYS

Raymond E. Smith, Hamden, Conn., assignor to The A. C. Gilbert Company, New Haven, Conn., a corporation of Maryland Application October 15, 1951, Serial No. 251,426

14 Claims. (Cl. 104—150)

This invention relates in general to electromagnetic production of power and/or sound selectively by means first, of an unmodulated current having a fundamental pulsating or alternating wave form, and secondly by means of a modulation of such current carried over the same supply line and having the same fundamental wave form punctuated by one or more differentiated series of wave interrupting peak potentials imparted thereto with a frequency or frequencies higher than that of the fundamental wave form. Among many of its possible uses, the invention affords ways and means for operating by remote track-side control both the running of a toy electric train and the independent action of a train carried producer of sound effects typical of railroading. The preferred sound producer is capable of successfully imitating the sound of a steam or air whistle of a locomotive, or factory or boat, or can imitate as well the blast of a diesel locomotive horn, a public warning siren, or the like.

The invention can also be used in connection with the electric lighting or electrical animation of industrial toys imitative of factories, saw mills, fire houses or the like, which toys by means of these improvements can be caused to give off sounds characteristic of factory whistles, buzz saws, sirens etc. from any desired remote point of electric control.

A general object of the invention is to modulate a fundamental current wave to which a loud speaker is normally subjected, yet silently insensitive, so that the speaker becomes active to generate sound when subjected to certain modulated forms of the fundamental wave.

In its application to toy electric trains an important object of the invention is to eliminate the necessity for motor powered blower fans and air resonance chambers heretofore proposed as apparatus for producing whistle imitative sounds in toy and model railroading.

Another object is to avoid problems that are encountered when signal sounds are started and stopped by selective energization of train carried special electromagnetic switches used in conjunction with the train carried relays conveniteonally employed for starting, stopping and reversing the locomotive driving motor.

Another object is to cause sounds to emanate from a toy train that are realistically imitative of a steam whistle or diesel horn, and without interfering in any way with the direction, smoothness, quietness or uniform speed of running of the train propulsion motor.

A specific object is to produce satisfactorily loud sounds that are realistically imitative of whistles or horns by means of apparatus small enough to be contained entirely within the much reduced space available in the hollow interior of toy train rolling stock of the now more popular minitature sizes.

A contributory object is to employ a train carried sound producing device equipped with an air wave inducing element that will fail to produce sound when the device is energized merely by ordinary toy train propulsion current, but which will give forth the wanted sound in response to predetermined modulation of such current. This enables the train carried, sound producing device to remain constantly in circuit with the electrified toy track rails and still not produce sound except when desired even though the locomotive propulsion motor is being energized in the ordinary manner through the same track rails.

A related object is to modulate the wave form of an ordinary alternating current for operating the sound producing device in an electrical system of such elements and arrangement that the device can be made to produce sound when the train is standing still with its propulsion motor deriving no current through the track rails.

A further object is to employ for the above purposes an electromagnetic vibratory circuit interrupter as the means to modulate the wave form of a sinusoidal fundamental alternating current such as is commonly supplied to toy railroad track.

A related object is to modulate a fundamental alternating current of relatively low frequency so as to punctuate its sinusoidal wave shape with peak potentials occurring with higher and audio frequency derived from inductive interruptions of the fundamental current. The inductive effect may be derived, at least in part, from electromagnetic windings of the propulsion motor of the train, or if the propulsion motor is cut out of the track circuit, then from such other electromagnetic inductive elements as may be present in the track circuit, as for instance from the winding of an electromagnetic speaker to be operatively incited by the peak potentials.

An important object is to cause such inductive interruptions to be of such extremely brief duration that they cause no appreciable interference with the speed or quietness of running of the train propulsion motor.

A further aim of the invention is to cause the aforementioned peaks to rise to such high potentials, either positive or negative, that the amplitude of responsive vibration of a single air wave inducing element in the sound producing device shall be increased to an extent to generate such loudness of sound as may be desired.

A still further object is to impart simultaneously to the sound producing device a plurality of series of wave punctuating peak potentials in a manner to cause a single air wave inducing element when electromagnetically responsive thereto to generate a complex sound composed of simultaneous tones such as pure tones and overtones or simultaneous tones of contrasting pitch thereby more faithfully to imitate the complex sound of a steam whistle.

The foregoing and other objects of the invention will become clear in greater particular in connection with the following description of successful embodiments of the invention, which description has reference to the appended drawings wherein:

Fig. 1 shows an assembly of toy electric railway apparatus incorporating the invention including toy train rolling stock carrying a signalling sound producer as well as a train propulsion motor, a stationary track-side electrical controller for governing the running of the toy train, a current interrupting vibrator, and a signal sounding electric switch for making said vibrator active or inactive as desired.

Figs. 2 and 3 are respectively broadside and edgewise elevations of the vibrator of Fig. 1.

Fig. 4 shows a partially cut-away view of the sound emitting device carried by the rolling stock in Fig. 1.

Fig. 5 shows a pure fundamental wave form of alternating current delivered to the railway track through the trackside controller of Fig. 1 for energizing both the propulsion motor and the sound producer and to which wave form the sound producer is silently insensitive.

Fig. 6 shows the fundamental form of current wave in Fig. 5 modulated by action of the vibrator of Figs. 1, 2 and 3 so as to cause the sound producer of Figs. 1 and 4 to emit a signalling sound.

Figure 13:
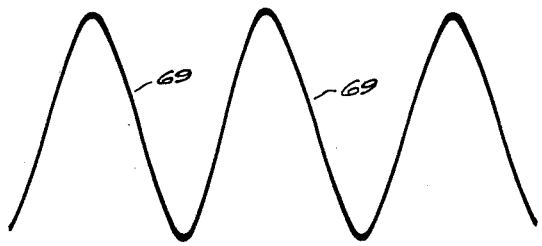
Figs. 13 and 14 are respectively enlarged reproductions of Figs. 5 and 6.

While the invention can be embodied in a considerable variety of circuit arrangements for a wide range of uses, I have chosen herein to illustrate its embodiment in an electrical system for operating toy trains and for on occasion causing signal sounds to emanate therefrom by remote control.

In Fig. 1 the toy train is represented by rolling stock comprising a car 12 hauled by a toy locomotive 13 driven by its carried electric propulsion motor 14 universal for A. C. and D. C., and fashioned externally to represent a diesel locomotive equipped with dummy signalling horns 15. The casing of locomotive 13 is partially broken away to expose at its interior a sound signalling device 18. An enlarged broken away view of this device is shown in Fig. 4.

The train 12, 13 is shown as standing or traveling on a course of electrically conductive relatively insulated toy track rails 19 supported by and insulated from sleepers 20 as usual. Electrical connections shown in Fig. 7 indicate that the propulsion motor 14 derives electric current through the track rails 19 and through relatively insulated traction wheels on respectively opposite sides of the locomotive and is controlled as to starting, stopping and reversal of the direction of train running by electromagnetic relay or step switch 21 also carried by the locomotive as is conventional in toy trains impelled by alternating current.

Fig. 1 shows connecting leads 24 and 25 placing the track rails 19, 19 respectively in electrical connection with an electromagnetic vibrator 35 and with the "full speed" binding post 27 of the train controller 29. This binding post is in constant electrical connection with the manually swung voltage varying element 30 that takes off current from selective lengths of the train running section 28 of the secondary winding of a toy transformer in the controller 29. The controller is stationed at the trackside for manually governing the speed and direction of running of the train in the usual way. Speed of the train running, according to conventional practice, is under control of the manual turn button or handle 30'. The primary winding 31 of the transformer derives power from any suitable source of alternating current (not shown), preferably at 60 cycles, through an attachment cord 32.

The herein referred to sound signalling device 18 that is mounted on the interior of locomotive 13 may take the form of a magnetic speaker either of the horn type or the cone type, but preferably shall be of the dynamic loud speaker type incorporating either a permanent type of field magnet or an electromagnetic field which latter is preferred in electrical systems for the particular purposes herein illustrated because of certain limitations in loudness and richness of tone that are inherent in magnetic speakers. In other words while some of the advantages of this invention can be obtained by the use of an ordinary ear-phone speaker, with or without any amplifying horn and whether employing a diaphragm of the metallic disc or paper cone types, a preferred form of speaker is that shown in Fig. 4. This is an unusually small and compact electrodynamic speaker in which a cup-like cylindrical metallic casing shell 47 has secured in firm metallic contact therewith the round, central, soft iron core 48 surrounded by a spool 49 of insulating material on which is wound the field coil 50. A paper cone 51, hereinafter sometimes referred to as an air wave inducing element, spans the open face of shell 47 and is attached by cement or other suitable means entirely around its circular peripheral border to the outwardly turned flange on the casing shell 47. Preferably the paper of cone 51 is circularly crimped at 52 near its mounted periphery thereby to afford flexible support for the sound generating central body portion of the cone.

Cone 51 further carries fixedly thereon a light weight annular tube-like extension 53, preferably of insulating material, which carries the moving or voice coil 54 so that the latter together with tube 53 is concentric with the axis of the cone and displosed within an annular electromagnetic flux gap afforded between the field core 48 and a circumferential metallic flange 55 on a web insert 56 that tightly fits the internal wall of shell 47, thereby to constitute a polarizing extension of the latter. While loud speakers of the electrodynamic type are customarily designed with a paper cone whose natural resonance is of a frequency lower than the frequencies at which the cone moves to generate audible sound, I have discovered that for the purposes of this invention the paper cone, which does not have the exacting duty required in radio reception, can to advantage have a natural resonance lying in the same range of frequency as the audible sounds it will be called upon to generate. Fig. 1 further shows a resistor 57 that may be carried at the interior of the locomotive for use in electrical connection with the loud speaker in the relationship indicated in Fig. 7. This permits larger wire and less heat in coil 54.

Heretofore electrodynamic loud speakers have been operated by impulsing solely the voice coil current while the current in the field coil has remained constant. This has been possible because in radio practice the separate coils commonly derive their current supply from respectively separate sources. I have discovered that an electrodynamic speaker can be caused to generate sounds satisfactorily for the purpose of this invention if the current in its field coil as well as the current in its voice coil are impulsed simultaneopsly at the sound generating frequency. Although it is common for loud speakers such as 18 to have their voice coils energized by very sensitive current variations derived from the signal circuits of radio sets for reproducing speech, music, and the like, the present invention contemplates a far simpler source of current pulses for motivating the voice coil 54 which makes it possible to eliminate electronic tubes and other complicated apparatus common to electrical systems for radio reception.

I have discovered that suitable current pulsation for the purposes hereof can be attained by unconventional use of an electromagnetic vibratory circuit interrupter such as 35 that is capable of modulating a fundamental alternating current wave form in a way to punctuate the same with a series of voltage peaks accompanied by such brief inductive interruptions of the fundamental current that the sound wave inducing element or diaphragm of a loud speaker when subjected thereto will respond in a manner to generate a variety of single or complex tonal sounds capable for instance of imitating with extreme fidelity steam whistles, diesel horns, sirens, etc.

Heretofore electromagnetic vibrators of this type have been used largely as step-up converters for changing low voltage direct current into relatively high voltage alternating current thereby to serve as alternating current source for the smaller types of battery powered radio receiving sets, such as portables and those used in automobiles.

Figure 11:
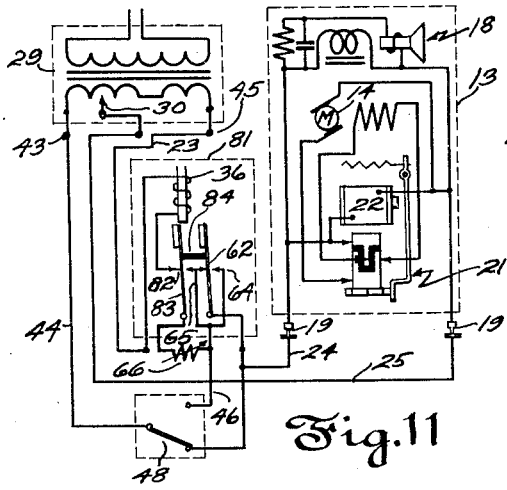
Fig. 11 shows the circuit of the vibrator driving coil of Fig. 7 automatically interrupted by the vibratory reed in a manner that would sustain vibration of the reed even with direct current supply.
Figure 12:
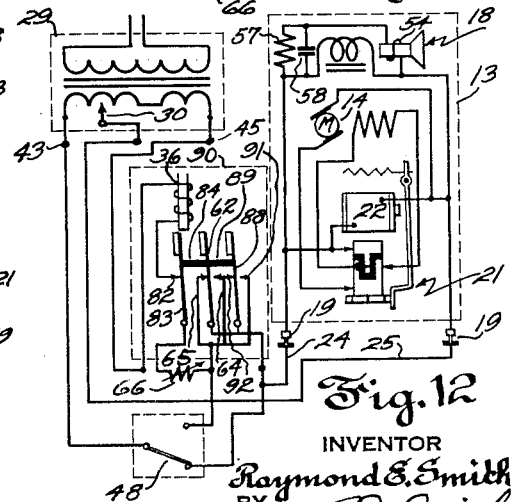
Fig. 12 shows the addition of extra circuit making and breaking reed operated contacts for producing a plurality of series of current punctuating peak potentials thereby to cause the sound producer to emit simultaneous tones of differing pitch.

Vibrators capable of functioning successfully in my new combination described may be of several varieties and can be rendered active or inactive at will by several different arrangements of manual switching control. Examples of these are illustrated in Figs. 7 to 12, inclusive. In general, however, the vibrator will be equipped with reed motivated make-and-break contacts effecting a higher frequency of circuit interruption than the frequency of pulsations or alternations of the fundamental current in the interrupted circuit. While the driving coil for the reed of the vibrator may be energized from a source of intermittent or alternating current separate from that of the circuit that is to be vibratively interrupted, I find it advantageous in some cases as shown in Figs. 11 and 12 to include the driving coil of the vibrator in the reed interrupted circuit.

Figure 10:
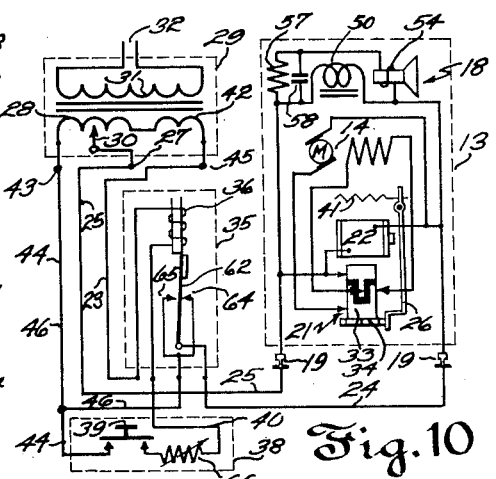
Fig. 10 shows the circuit of the vibrator driving coil of Figs. 7, 8 and 9 opened and closed by a momentary circuit making switch substituted for the momentary circuit breaking switch of Fig. 9.

Fig. 10 shows how a vibrator 35 with uninterrupted driving coil circuit will be electrically connected by a lead 24 to one of the track rails 19 and by means of another lead 23 with the base binding post 45 of controller 29; also how the driving coil 36 of the vibrator has one of its terminals connected by a lead 40 with a signalling control switch 38 which is also connected to the full voltage binding post 43 of the controller 29 by a lead 44. Binding post 43 is capable of delivering, say, 15 volts.

Referring more particularly to Figs. 2 and 3, a form of vibrator is shown that is susceptible of use in the electrical system of Fig. 10 wherein the resilient reed 62 is normally biased toward the right of the axis of the magnet core of the driving coil 36 so as normally to make circuit between reed carried contact 63 and one of the stationed contacts 64. At this time the contact 65 that is stationed on the opposite side of the reed is separated from reed carried contact 63'. Vibrating contacts 63 and 63' are united conductively with each other and with the metal blade of the reed.

Figure 14:
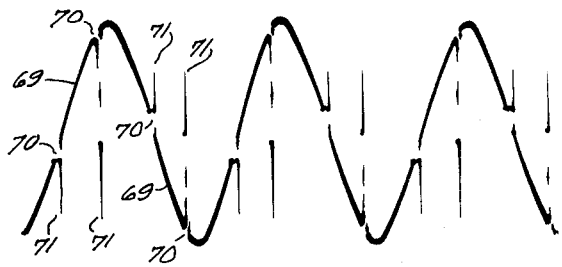

Upon energizing the driving coil 36 with 60-cycle alternating current, the reed carried armature will be drawn toward the left in Fig. 3 at each occurrence of peak potential in the coil energizing alternating current. The contact positions may be so adjusted that during travel of the reed into its magnetic field about 90% of the resulting, flexure resisted excursion of the reed toward stationary contact 65 will take place before contact 63 separates from contact 64 because of the resilient following-up flexure of the latter. Contacts 63 and 64 will separate to break the circuit just before contact 63' closes with contact 65. By this time the peak value of the alternating current in coil 36 has diminished to zero and reed armature 61 therefore becomes magnetically released to be returned by its own spring bias to its starting position, whereupon contacts 63 and 64 again close. This excursion of the reed automatically repeats during each half cycle of the uninterrupted alternating current by which the driving coil is incited. Thus in response to a 60-cycle alternating current the reed will make 240 excursions per second and at each excursion the same circuit is broken twice between the reed carried contacts and the stationary contacts 64 and 65. In other words there occur 480 breaks per second of a 60 cycle utilization circuit in which each of stationary contacts 64 and 65 constitute terminals. Such frequency of current interruptions is shown in the wave curve of Fig. 16, but if contact is made and broken at only one side of the reed the frequency of circuit interruptions would drop to 240 per second as is illustrated in Figs. 6 and 14. Even this frequency of circuit interruption will produce sounds faithfully imitative of certain musical tones having a range of timbre quality as do various non electrical sound producing instrumentalities.

This modulation of the fundamental sixty cycle current wave graphically represented in Figs. 5 and 13 is shown in Figs. 6 and 14 as it would characteristically appear on an oscillograph, there being produced because of inductance derived from one or another of the coils that are in series with contacts 64 and 65, extremely brief breaks 70 of the fundamental 60-cycle wave 69 accompanied respectively by simultaneous peak potentials 71 forming a series of current impulses four times as frequent as is the frequency of the fundamental current wave 69.

This constitutes one of many ways in which a fundamental current wave can be modulated by a magnetic vibrator as distinguished from mere superimposition of a supplemental wave on a carrier wave. The modulation consists of actually complete instantaneous interruptions of the fundamental wave accompanied by a kick-back inductive effect induced by the presence of inductance in the interrupted circuit. The resulting peak potentials which occur at a frequency of 240 times per second in Fig. 14 and 480 times per second in Fig. 16 impart that rapidity of impulses to voice coil 54 and simultaneously to the field coil 50 of the electrodynamic loud speaker 18. At other times when the speaker 18 is subjected only to the 60-cycle wave of the fundamental alternating current shown in Fig. 5 its voice coil 54 is not incited with sufficient frequency and magnetic force to cause the speaker cone 51 to generate audible sound waves.

For purposes of distinguishing between a relatively low frequency, as for instance the 60-cycle frequency of an ordinary alternating current, and a relatively higher frequency, sometimes but not necessarily an even multiple of 60-cycles, the relatively lower frequency, whatever it may be, is herein sometimes referred to as a subsignalling frequency and the higher frequency as a signalling frequency.

The complete electrical system will first be explained with reference to Fig. 10 of the drawings. In this circuit arrangement there has already been mentioned the locomotive propulsion motor 14, the loud speaker 18 having field coil 50 and voice coil 54, track rails 19, motor reversing relay 21, primary winding 31 and sections 28 and 42 of the secondary winding of variable supply transformer 29, driving coil 36 and contacts 63, 63', 64 and 65 of the vibrator 35, and signal switch 38. In addition, Fig. 10 shows a variable resistor 66 that may be used to vary the strength of current in the driving coil 36 of the vibrator for increasing or decreasing the amplitude of vibration of its reed 62.

When the utilization circuit is broken by the reed contacts inductive kick-back is attainable, aside from driving coil 36, from any or all of the inductively wound coils that are present in parallel relationship in the track or load circuit including the field and voice coils 50 and 54 of the speaker 18, the winding of the propulsion motor 14, and the magnet coil 22 of the conventional motor reversing relay or step switch 21. Details of this relay are disclosed in fuller detail in U. S. Patent No. 2,196,319. Each time current is manually cut off from the track by turning controller handle 30' far enough in voltage decreasing direction, the magnetic armature of stepping pawl 26 for the current commutating drum 33 is pulled back a step by spring 41 ready to engage a new tooth of the ratchet wheel 34 that is actuated thereby so that when current is next supplied to the track a forward stroke of the stepping pawl is caused by solenoid 22 which advances the drum rotatively a fraction of a turn. Repetition of cut off and restoration of current to the track causes switching of the circuit connections of the reversible universal A. C. or D. C. motor 14 by relay 21 in such sequence that at first the motor will run in forward direction, next the motor will stop, next the motor will run in reverse direction and next the motor will stop—this cycle being completed by two sustained breaks alternating with two remakes of the track circuit by the manual controller 30, the cycle repeating indefinitely in the order named.

While the motor reversing switch 21 is operatively sensitive to sustained cutting-off of the current to the track rails, I have discovered that pawl 26 will not respond operatively to the extremely brief, rapidly repeated, automatic breaks of current represented at 70 in Fig. 6, but that the train will keep on running uninterruptedly in the same direction or remain standing at rest on the track regardless of this kind of signal producing modulation of the normal wave form of operating current shown in Fig. 5.

It already has been explained that speaker 18 is operably nonresponsive to the fundamental current wave of Fig. 5. Since we now know that the motor reversing relay 21 is operably nonresponsive to the vibrator modulated form of current wave shown in Fig. 6, this makes possible the following features of operation in the electrical system of Fig. 10.

Signal sounding switch 38 being normally open, the vibrator driving coil is normally deenergized and the vibrator reed 62 idle, but the latter serves through the closed relationship of contacts 63 and 64 to complete a circuit from the base binding post 45 of the supply transformer 29 to the track 19, there being always a return path from track to binding post 27 of the controller by means of lead 25. Driving coil 36 of the vibrator, however, stands unenergized, thereby to exclude vibrator 35 from active participation in the track or utilization circuit until push button 39 of switch 38 is manually depressed to sound a whistle or horn-like signal. Hence up to this time only an unmodulated form of current wave, as represented in Fig. 5, is delivered to track rails 19, 19. Speaker 18 is silently nonresponsive to this sub-signalling frequency of current wave. As soon as button 39 is depressed vibrator driving coil 36 will be energized causing the reed 62 to vibrate with circuit making and breaking relation to vibrator contacts 64, 65. This modulates the current wave of Fig. 5 converting it to a form somewhat as shown in Fig. 6 and generating therein voltage fluctuations of a higher or signalling frequency to which speaker 18 is operably responsive in a manner to generate whistle or horn-like tonal sounds. At all times when signalling switch 38 is open, the train can be run, stopped, reversed and restarted under control of manual turn button 30 through the train operating, variable speed control section 28 plus the constant section 42 of the transformer secondary in conjunction with the responsive action of the train carried, motor reversing relay 21. Also at all times, whether relay 21 is or is not transmitting track current to propulsion motor 14, closing of switch 38 will furnish modulated signalling current to the speaker 18 through the track rails by reed action of vibrator 35, speaker 18 being constantly in circuit across the track rails to receive this modulated form of current independently of the motor reversing relay 21.

Figure 9:
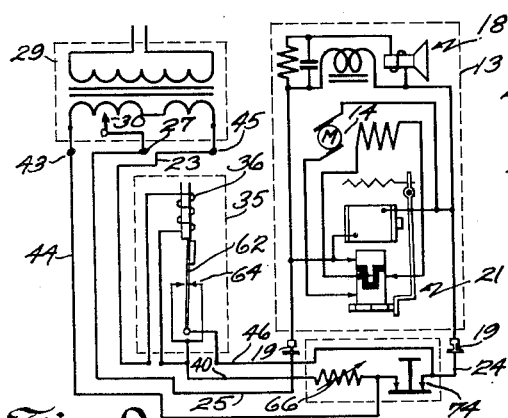
Fig. 9 shows a momentary circuit breaking switch substituted for the double-throw switch of Fig. 8.

In Fig. 9 the same conditions obtain as in Fig. 10 except that a normally closed momentary circuit breaking switch 74 normally short circuits the vibrator contacts 63—64 through connection 46. The driving coil 36 of the vibrator 35 is constantly energized through the connections 43, 44, 66, 40, 23. When momentary switch 74 is manually opened the already vibrating reed produces the modulated signal sounding current in the track circuit as before.

Figure 7:
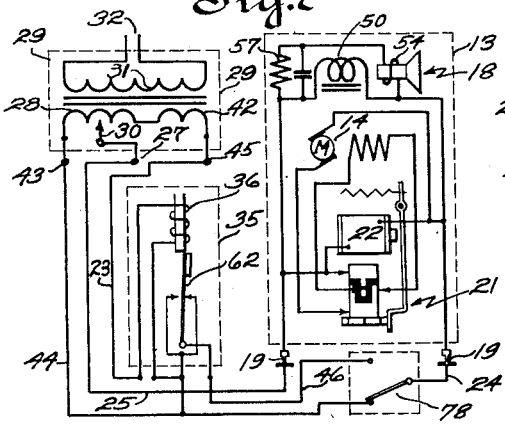
Fig. 7 is a wiring diagram of one of many possible electrical systems incorporating the invention and comprises a hook-up of toy railway apparatus wherein the circuit of the driving coil of the vibrator is constantly energized and uninterrupted by the make-and-break action of the vibratory contacts and the vibrator is rendered active or inactive by a two-way or double throw switch.

In Fig. 7, which otherwise is much like Figs. 9 and 10, a two-way or double-throw switch 78 is substituted for the momentary contact switches of Figs. 9 and 10, the circuit connections being otherwise as in Fig. 9 and the driving coil 36 of the vibrator being always in circuit.

Figure 8:
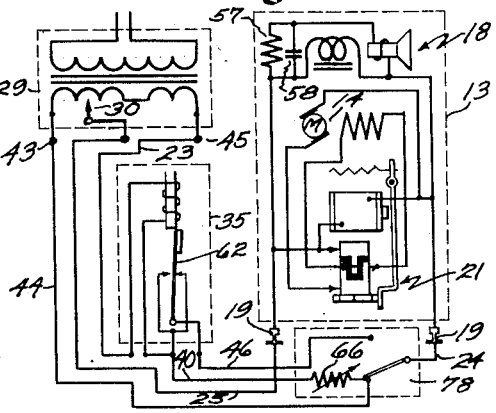
Fig. 8 shows a modified electrical system like that in Fig. 7 except with the addition of a variable resistance to govern the amplitude of reed excursion in the vibrator.

Fig. 8 shows a circuit arrangement with the variable resistance 66 for tuning the vibration action omitted.

In Fig. 11, the driving coil 36 of vibrator 81 is placed in series with an additional circuit making and breaking driving contact 82 that is cooperative with an extra or driving reed 83 mechanically connected to flex and vibrate in unison with reed 62 by an insulative mechanical coupling 84. While 83 and 62 are diagrammatically shown as two mechanically coupled reeds they may in practice comprise a single resilient conductive blade carrying relatively insulated contacts thereon (not shown) for cooperation respectively with stationed contacts 65 and 82 as is well understood in the art of vibrator construction.

Vibrator 81 in Fig. 11 will operate on direct current as well as on alternating current and the periodicity of vibration of the reed will be a function of its resilient strength, its length, the strength of electromagnetic flux etc. Hence a variable resistance such as 66 if introduced into series with vibrator driving coil 36 in Fig. 11 will vary and determine the frequency of circuit making and breaking action of the reed. This will vary the frequency and potential strength of signal sounding impulses impressed upon the loud speaker 18 by those interruptions of a fundamental current wave that are introduced into the track or utilization circuit by the vibrator action for causing the speaker to generate a signalling sound. The pitch and loudness of the resulting tone can be varied and determined by adjusting variable resistance 66.

Fig. 12 shows an electrical system like that of Fig. 11 except that still another circuit interrupter reed 88 is introduced in vibrator 90 and mechanically coupled by insulation 89 to cause it to vibrate in unison with reeds 62 and 83 while insulated therefrom. Additional stationary contacts 91 and 92 which are opened and closed by reed 88 may be adjusted in positional relationship and follow-up ability to be out of step with the opening and closing of contacts 64—65 by reed 62 whereupon a signal sound of complex tone will be caused by the responsive vibration of the single, air wave inducing diaphragm 51 of speaker 18. The multiple circuit making and breaking contacts of vibrator 90 may also be adjusted to raise the frequency of current interruptions 70 and peak potentials 71 to frequencies of 400 to 500 or more as is well understood in the art.

Nonlimiting examples of electrical values that may successfully be chosen among others for the various circuit connected elements hereinbefore described are as follows:

| | |
|---|---|
| Supply potential at binding post 27. | 7½ to 15 volts, A. C. |
| Supply potential at binding post 43. | 15 volts, A. C. |
| Propulsion motor 14, universal, reversing. | 3-pole type draws .87 ampere at 15 volts, no load. |
| Resistance 66 | 40 to 50 ohms. |
| Speaker field coil 50 | 405 turns of #27 wire, 5 ohms. |
| Speaker voice coil 40 | 80 turns of #36 wire in two layers, 32 ohms. |

While the basic purposes of this invention may be served by the bare combinations hereinbefore disclosed, as to ability of the speaker 18 to receive and operatively respond to a designed type of modulated current and to reject and be operatively nonresponsive to a designed type of unmodulated current, I have discovered that the ability of the speaker in this respect can be enhanced and a greater range of sound variation and sound intensity can be obtained by building into the speaker and its electrical circuit both mechanical and electrical resonance.

Mechanical resonance of a preferred kind in the speaker is obtained by choosing for the material, the dimensions and the manner of mounting of cone 51 factors that cause the cone to possess a natural resonant period corresponding to 480 cycle impulses and to possess but little if any vibratory response to frequencies below 100 cycles. The small diameter of the cone, the thickness and stiffness or flexibility of its material, the angle of its dished formation and the nature of its hinge crimping at 52 can readily be so related by those skilled in the art as to impart to the cone its natural resonant period referred to. Fig. 4 shows the speaker in a preferred natural size wherein the paper cone diameter may be about 1⅝" and its thickness .004 inch, the voice coil being wound on a diameter about one third as large as that of the cone.

Electrical resonance of a preferred kind in the speaker can be obtained by proper choice of the resistor 57 preferably but not necessarily in shunt to a capacitor 58 and both connected in circuit as shown in all of Figs. 7 to 12, inclusive, and which also serves to relieve coil 54 from heating.

The field winding 50 of the speaker as hereinbefore explained is directly across the 60 cycle line and also receives the, say, 480 impulses of the modulated or signalling current when the vibrator is caused to operate. This field winding may be chosen to have an A. C. impedence that is near resonance at 60 cycles. Such impedance tends to reject the 480 cycle impulses and is attained by a high ratio of inductance to resistance. On the other hand, the voice coil winding 54, having relatively few turns of fine wire has a low ratio of inductance to resistance. Hence it will receive the 480 cycle impulses as well as the 60 cycle impulses and even without resistor 57 can be electrodynamically activated by the higher frequency while operably immune to the lower frequency.

I have found that maximum electrical resonance is obtainable responsive to 480 cycle impulses by use of the resistor 57 and capacitor 58 connected in the speaker circuit as shown, both being carried by the toy train. The electrical values of all elements concerned will be chosen to produce a natural electrical resonance in the neighborhood of 480 cycles. This is found to give a loud cleartoned whistle sound at around 480 cycles with practically no audible 60 cycle hum when the speaker is not in intended operation.

With further reference to the use of resistor 57 with or without capacitor 58, it has been found that tone clarity and quality is good with use of the resistor alone, but that the capacitor or condenser added in shunt with the resistor produces more volume and loudness of tone and in general is worth the additional cost entailed even in the market for toys where permissible costs are strictly limited. Resistor 57 may be 65 ohms and capacitor 58 may be 5 microfarads.

Figure 15:
Fig. 15 shows a result of modified circuit interruption on the fundamental wave form of Fig. 13.
Figure 16:
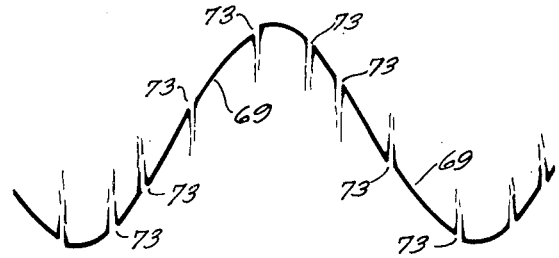
Fig. 16 shows a possible time spacing of a multiplied frequency of vibrator caused interruptions of the fundamental wave form.
Figure 17:
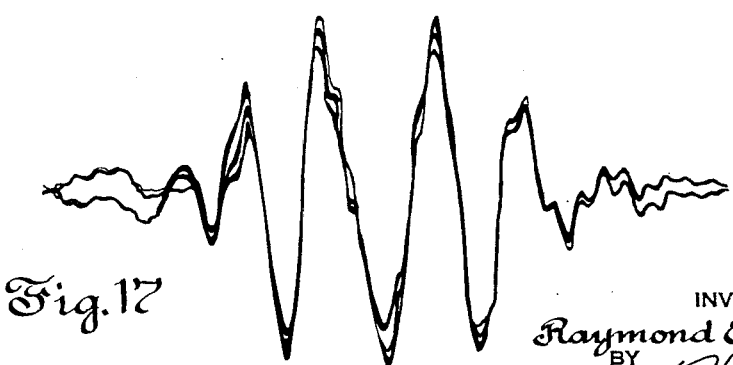
Fig. 17 shows characteristics of a sound wave resulting from circuit interruptions similar to those in Fig. 16.

Illustrative of actual oscillograph showings of wave characteristics involved in this invention, Figs. 13 and 14 are respectively enlarged showings of the hereinbefore explained curves of Figs. 5 and 6. Fig. 15 shows the corresponding curve that would be produced by improper circuit interrupting vibrator action wherein the breaks 72 are so long that the running of the train motor 14 might be interfered with and cause irregular or slowed running of the train while the whistle is being "blown." Fig. 16 shows vibrator caused interruptions of the track circuit at the frequency of 480 cycles. The vibrator contacts may be so spaced that the interruptions are at a constant time spacing as in Fig. 14 or at an uneven time spacing as in Fig. 16. Even spacing tends to clarity of tone while time irregularities in the circuit interruptions tend to mellowness in the timbre of the sound indicated by the gossamer characteristic of the wave line in Fig. 17. This wave was recorded by an oscillograph into which was fed by microphone the characteristics of sound waves produced by the kind of vibrator interruption pictured in Fig. 16. Thus vibrator contacts may be adjusted for timing by their spacing from and ability to follow the reed or reeds in the vibratory movement thereof, and crispness of timbre can be imparted to the sound by high harmonics as is characteristic of shrill whistles like the flute or police whistles or a muffled quality can be imparted to the sound by low harmonics as is characteristic of hoarse whistles such as the whistles of steam whistles, diesel horns, etc.

The art of electromagnetic vibratory circuit interrupters is so profuse that only a few patents need be referred to showing some of the features of vibrator construction and operation that may be utilized in an interrupter suitable for use in the systems proposed herein, namely, U. S. Patent Nos. 1,961,058; 2,043,290; 2,065,597; 2,213,854; 2,519,731.

Many variations of circuit arrangements other than those in Figs. 7 through 12 chosen to illustrate the invention will be suggested to workers in the art by the disclosure hereof and considerable departure may be made from the illustrative electrical values above mentioned as a rough guide for practice of the invention in the art of toy or model railroading. The following claims are directed to and intended to cover all variations, substitutes and equivalents of the parts and arrangements illustrated herein which come within the broadest fair interpretation of their terms.

I claim:

1. The method of causing at will an occasional emission of whistle imitating sound from a normally silient sound producing device of the electromagnetic type having a vibratory air wave inducer constantly sensitive to electric current supplied to said device, which comprises, constantly supplying said device with alternating current having a simple sinusoidal carrier wave shape to which said inducer will vibrate responsively at less than whistle imitating frequency and at sufficiently low voltage to fail to cause audible amplitude of vibratory excursions of said inducer, and on occasion intermittently making and breaking said alternating current in a manner to cause gaps in said carrier wave shape bridged by induction amplified voltage peaks occurring with rapidity at least equal to whistle imitating frequency, whereby said air wave inducer is incited to vibrate with sufficiently great amplitude and rapidity to generate whistle imitating sound.

2. The method of causing at will by remote electrical control a tonal sound by means of normally silient sound producing device of the electromagnetic type having a magnetically impulsed vibratory air wave inducer carried on the rolling stock of a toy electric train running on toy track rails and impelled by a train carried propulsion motor electrically energized by current conducted through said rails, which comprises, supplying said sound producing device and said propulsion motor simultaneously through said track rails with alternating current of simple sinusoidal wave shape at a frequency affording train impelling energization of said impulsion motor but less than that required to produce a tonal sound, and on occasion making and breaking said alternating current intermittently and inductively in a manner to cause gaps in said wave shape bridged by tonal sound producing high voltage peaks, said gaps being of such brief duration that the train impelling energization of said propulsion motor is not interfered with and said voltage peaks extending to sufficiently high potential at sufficiently high frequency to incite said inducer to vibrate with sufficient amplitude and rapidity to generate an audible tonal sound.

3. An electrical system for operating toy trains and on occasion causing signal sounds to emanate therefrom by remote control, comprising in combination, toy track rails, toy rolling stock on said rails, a supply circuit normally delivering to said rolling stock through said rails continuous current having sinusoidal wave form alternating at subsignalling frequency, a train carried propulsion motor in said circuit carried by said rolling stock and operative when energized by said current to impel said rolling stock, a sound signalling device constantly in said circuit carried by said rolling stock, including an electromagnetically incited vibratory air wave inducer operative to produce sound when magnetically impulsed at signalling frequency but inoperative to produce sound responsively to said current of subsignalling frequency, a vibratory circuit making and breaking current interrupted having at least one electromagnetically vibrated reed and having electric contacts mechanically opened and closed by vibration of the reed and electrically connected thereby to make and break said circuit with signalling frequency, and circuit switching means in said supply circuit electrically connected on one occasion to enable said supply circuit to by-pass said contacts and electrically connected on another occasion to include said contacts operatively in said circuit, thereby to subject said supply circuit to alternate making and breaking by said current interrupter to superimpose signalling frequency and cause said device to emit a signal sound.

4. An electrical system comprising, toy track rails, toy train rolling stock on said rails, an electric circuit including said rails and rolling stock and an inductive load carried by the latter, a source of continuous current delivered to said circuit alternating at subsignalling frequency, a train propulsion motor in said circuit comprising a part of said inductive load, a sound signalling device constantly in said circuit comprising a part of said inductive load operative to produce sound when energized by current impulses only of signalling frequency, a vibrating current interrupter operative intermittently to break said circuit with inductive reaction from said load to produce signalling frequency, and an electric switch in stationary relation to said rails electrically connected in the system circuit in a first condition to exclude said interrupter operatively from said supply circuit and in a second condition to include said interrupter operatively in said circuit thereby to cause said device to produce signalling sound only in said second condition of said switch.

5. An electrical system comprising, an electromagnetic sound signalling device adapted to remain silent when subjected to alternating current reversals of subsignalling frequency, a translative inductive load, an electric circuit constantly including said device and said load, a source of continuous current delivered to said circuit alternating at subsignalling frequency, and a vibratory current interrupter in said circuit including an electromagnet connected to transmit said alternating current, a reed carried armature responsive to said electromagnet in a manner to perform vibratory excursion at subsignalling frequency in the field of said electromagnet, electric contacts in said circuit connected to be opened and closed momentarily by said reed thereby to make and break said circuit a plurality of times during each single vibratory excursion of said armature at signalling frequency thereby to make and break said circuit with frequency producing sound signalling operation of said device.

6. An electrical system comprising a loud speaker silently nonresponsive to current pulsations of subsignalling frequency, an electrically inductive translative load, a utilization circuit constantly including said speaker and load, a source of continuous current alternating at subsignalling frequency for normally energizing said circuit, a vibratory automatic circuit maker and breaker electrically cooperative with said inductive load to produce intermittent breaks of said utilization circuit accompanied by simultaneous voltage peaks at higher than subsignalling frequency, and current switching means electrically connected to exclude said circuit maker and breaker from operation in said utilization circuit for maintaining said speaker silent on one occasion and on another occasion to render said circuit maker and breaker operative in said utilization circuit for causing said speaker to emit signalling sound.

7. An electrical system comprising an electrodynamic loud speaker having a voice coil motivated diaphragm that remains silently nonresponsive to current pulsations of subsignalling frequency, an electrically inductive translative load electrically connected in parallel with said voice coil, a utilization circuit constantly including said voice coil and load, a source of continuous current applied to said utilization circuit alternating at subsignalling frequency for energizing said load, a vibratory automatic circuit maker and breaker cooperative with said inductive load to produce intermittent breaks of said utilization circuit accompanied by simultaneous voltage peaks at higher than subsignalling frequency, and current switching means electrically connected to exclude said circuit maker and breaker from operation in said utilization circuit for maintaining said speaker silent on one occasion and on another occasion to render said circuit maker and breaker operative in said utilization circuit for causing said speaker to emit signalling sound.

8. An electrical system comprising a loud speaker silently nonresponsive to current pulsations of subsignalling frequency, a toy track, toy rolling stock on said track carrying said speaker, an electrically inductive translative load comprising a propulsion motor carried by said rolling stock, a track circuit constantly including said speaker and propulsion motor, a source of continuous current alternating at subsignalling frequency for normally energizing said track circuit to run said train, a vibratory automatic circuit maker and breaker cooperative with said inductive load to produce intermittent breaks of said track circuit accompanied by simultaneous voltage peaks at higher than subsignalling frequency, and current switching means electrically connected to exclude said circuit maker and breaker from operation in said track circuit on one occasion and on another occasion to render said circuit maker and breaker operative therein for causing said speaker to emit signalling sound.

9. An electrical system comprising an electrodynamic loud speaker having an electrically inductive field coil and a voice coil with a diaphragm motivated by the latter and silently nonresponsive to current pulsations of subsignalling frequency, an electrically inductive translative load electrically connected in parallel with said field coil and said voice coil, a utilization circuit constantly including said field coil, said voice coil and said load, a source of continuous current alternating at subsignalling frequency normally connected to energize said utilization circuit, a vibratory automatic circuit maker and breaker electrically cooperative with said field coil and load to produce intermittent breaks of said utilization circuit accompanied by simultaneous voltage peaks of higher than subsignalling frequency, and current switching means electrically connected to exclude said circuit maker and breaker from operation in said utilization circuit on one occasion and on another occasion to render said circuit maker and breaker operative therein for causing said speaker to emit signalling sound.

10. An electrical system comprising a loud speaker silently nonresponsive to current pulsations of subsignalling frequency, a toy track, toy rolling stock on said track carrying said speaker, an electrically inductive translative load comprising both a propulsion motor and an electromagnetic relay both carried by said rolling stock, said relay being connected to start and stop said motor and having a magnet coil connected in parallel with said speaker, a track circuit constantly including said speaker said motor and said magnet coil, a source of continuous current alternating at subsignalling frequency for energizing said track circuit, a vibratory automatic circuit maker and breaker electrically cooperative with said inductive load to produce intermittent breaks of said track circuit accompanied by voltage peaks at higher than subsignalling frequency, and current switching means electrically connected alternately to exclude said circuit maker and breaker from operation in said track circuit on one occasion and on another occasion to render said circuit maker and breaker operative therein for causing said speaker to emit signalling sound.

11. An electrical system comprising a loud speaker silently nonresponsive to current pulsations of subsignalling frequency, a toy track, toy rolling stock on said track carrying said speaker, an electrically inductive translative load comprising a propulsion motor and an electromagnetic relay carried by said rolling stock, said relay being connected to start and stop said motor and having a magnet coil connected in parallel with said speaker, a track circuit constantly including said speaker, said motor and said magnet coil, a source of continuous current alternating at subsignalling frequency for energizing said track circuit, an automatic circuit maker and breaker comprising make and break contacts in series with said inductive load in said track circuit motivated by an electromagnetically vibrated reed oscillating with sufficient rapidity to avoid deenergizing said magnet coil, and current switching means electrically connected alternately to exclude said make and break contacts from operation in said utilization circuit on one occasion and on another occasion to render said contacts operative therein for causing said speaker to emit signalling sound.

12. An electrical system comprising an electrodynamic loud speaker having a field coil and a voice coil, a vibratory diaphragm mounted to be motivated by electrodynamic movement of said voice coil, an electrically inductive translative load operably energizable by either subsignalling or signalling frequencies, a utilization circuit constantly including therein said field coil said voice coil and said load in parallel relation, a source of continuous current alternating at subsignalling frequency electrically connected to energize said utilization circuit, said diaphragm possessing mechanical resonance resistive to said subsignalling frequency, a vibratory circuit interrupter automatically operative intermittently to break said utilization circuit with inductive reaction from said load resulting in voltage peaks occurring at signalling frequencies higher than said subsignalling frequency, said diaphragm possessing mechanical resonance in the range of said signalling frequencies, and current switching means for selectively rendering said circuit interrupter operative or inoperative in respect to current derived by said utilization circuit from said source.

13. An electrical system comprising an electrodynamic loud speaker having a field coil and a voice coil, a vibratory diaphragm mounted to be motivated by electrodynamic movement of said voice coil, an electrically inductive translative load operably energizable by either subsignalling or signalling frequencies, a utilization circuit constantly including therein said field coil said voice coil and said load in parallel relation, a source of continuous current alternating at subsignalling frequency electrically connected to energize said utilization circuit, said voice coil possessing electrical resonance resistive to said subsignalling frequency, a vibratory circuit interrupter automatically operative intermittently to break said utilization circuit with inductive reaction from said load resulting in voltage peaks occurring at signalling frequencies higher than said subsignalling frequency in said utilization circuit, said voice coil possessing electrical resonance in the range of said signalling frequencies, and current switching means for selectively rendering said circuit interrupter operative or inoperative in respect to current derived by said utilization circuit from said source.

14. An electrical system comprising an electrodynamic loud speaker having a field coil and a voice coil, a vibratory diaphragm mounted to be motivated by electrodynamic movement of said voice coil, an electrically inductive translative load operably energizable by either subsignalling or signalling frequencies, a utilization circuit constantly including therein said field coil said voice coil and said load in parallel relation, a source of continuous current alternating at subsignalling frequency electrically connected to energize said utilization circuit, said voice coil possessing electrical resonance resistive to said subsignalling frequency, a vibratory circuit interrupter automatically operative intermittently to break said utilization circuit with inductive reaction from said load resulting in voltage peaks occurring at signalling frequencies higher than said subsignalling frequency, said voice coil possessing electrical resonance in the range of said signalling frequencies and said field coil possessing electrical resonance more receptive to said subsignalling than to said signalling frequencies, and current switching means for selectively rendering said circuit interrupter operative or inoperative in respect to current derived by said utilization circuit from said source.

References Cited in the file of this patent

UNITED STATES PATENTS

| | | |
|---|---|---|
| 1,519,477 | Beach | Dec. 16, 1924 |
| 1,774,754 | Lewis | Sept. 2, 1930 |
| 1,961,058 | Mace | May 29, 1934 |
| 2,187,064 | White | Jan. 16, 1940 |
| 2,292,565 | Jordon | Aug. 11, 1942 |
| 2,299,671 | White | Oct. 20, 1942 |
| 2,305,953 | Cress | Dec. 22, 1942 |
| 2,459,038 | McKnight | Jan. 11, 1949 |
| 2,521,240 | Milne | Sept. 5, 1950 |
| 2,622,542 | Bonanno | Dec. 23, 1952 |
| 2,645,768 | Santino | July 14, 1953 |
| 2,714,859 | Klemme | Aug. 9, 1955 |

FOREIGN PATENTS

| | | |
|---|---|---|
| 820,714 | France | Aug. 9, 1907 |
| 326,296 | Great Britain | Mar. 13, 1930 |
| 329,328 | Great Britain | May 13, 1930 |